Figure 6:
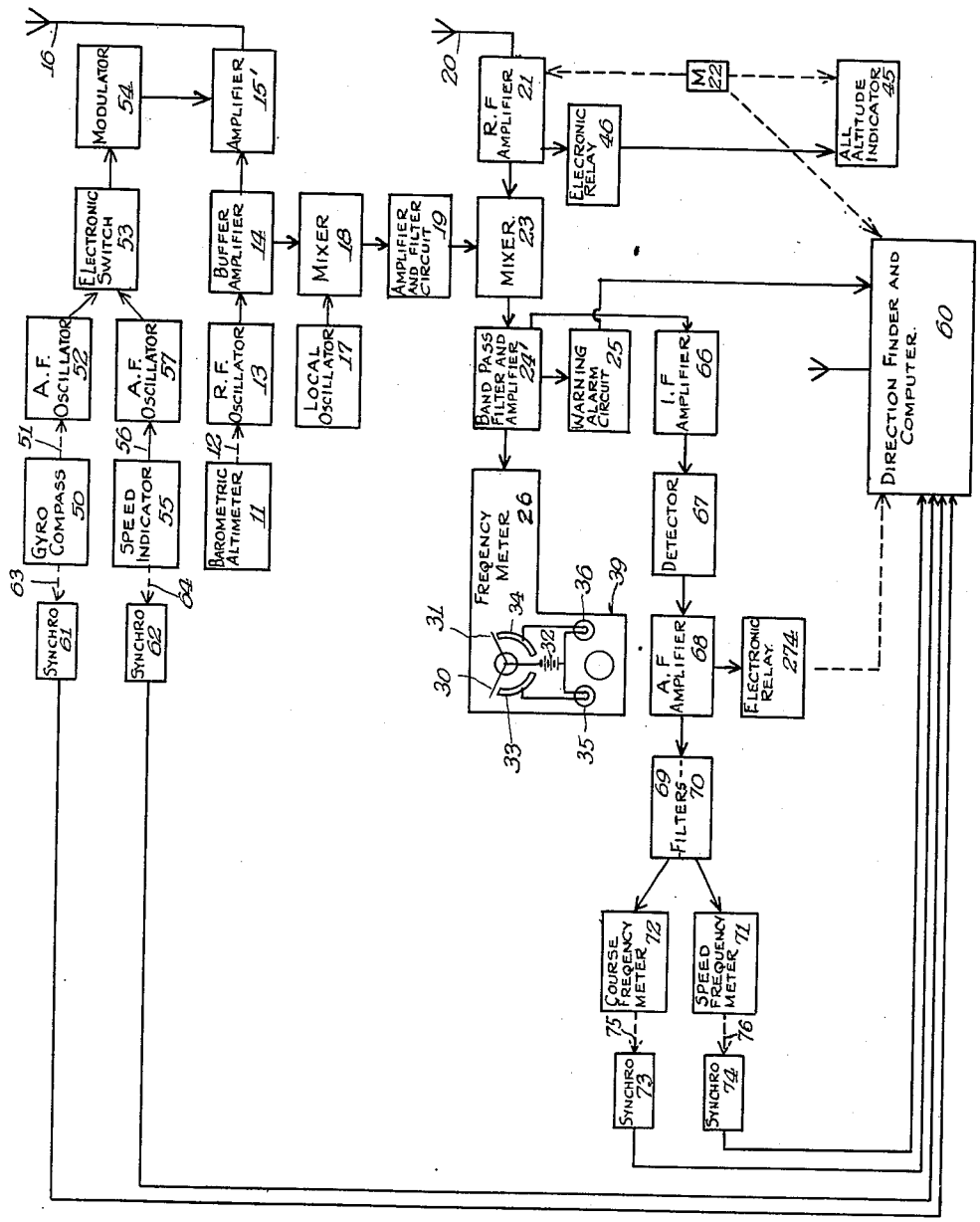

Sept. 18, 1951     T. A. STANSBURY     2,568,568
AIRCRAFT NAVIGATIONAL AID
Filed March 10, 1947     3 Sheets-Sheet 1
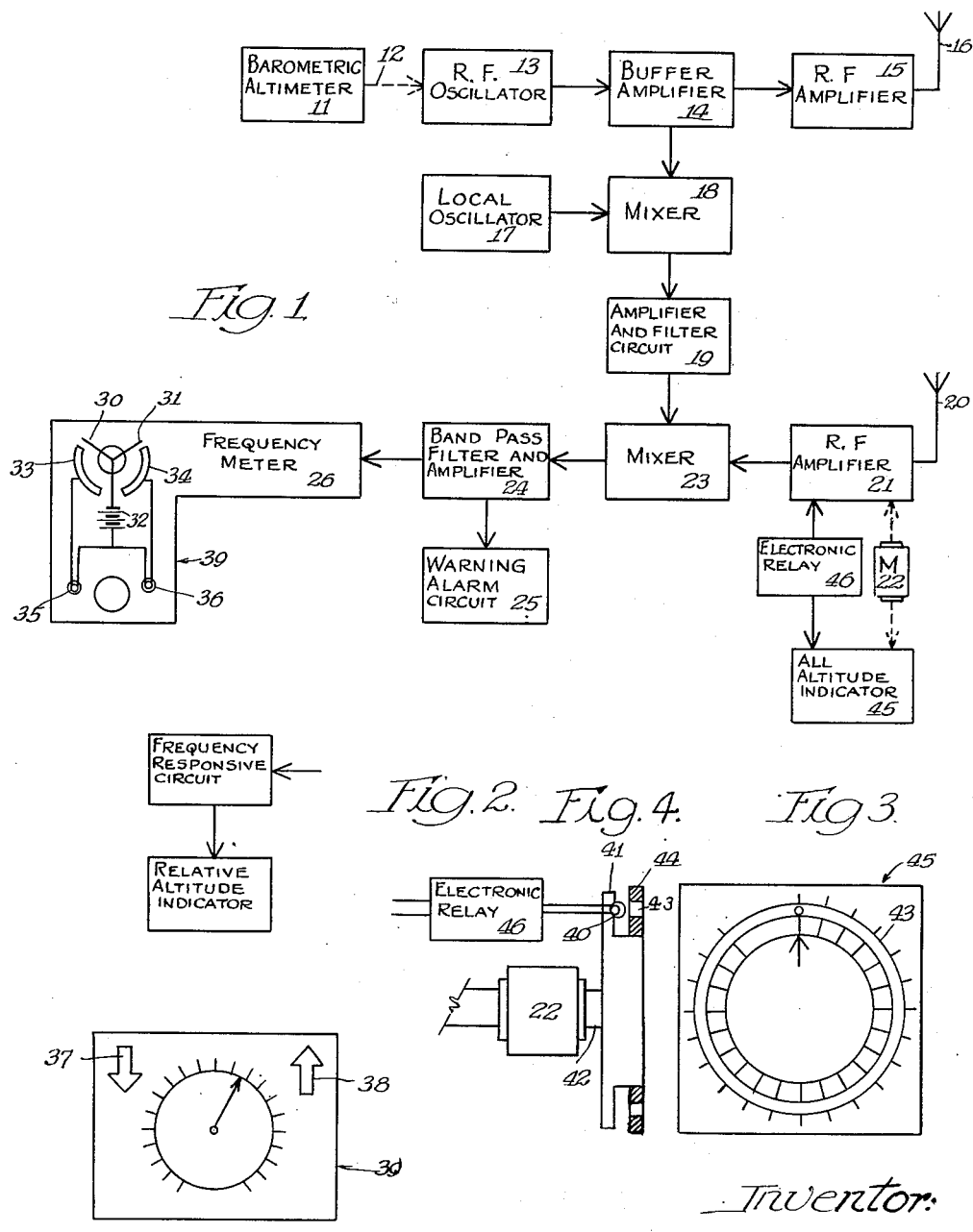

Sept. 18, 1951  T. A. STANSBURY  2,568,568
AIRCRAFT NAVIGATIONAL AID
Filed March 10, 1947  3 Sheets-Sheet 2

Inventor
Thomas A Stansbury
By Clarence J Loftus
atty

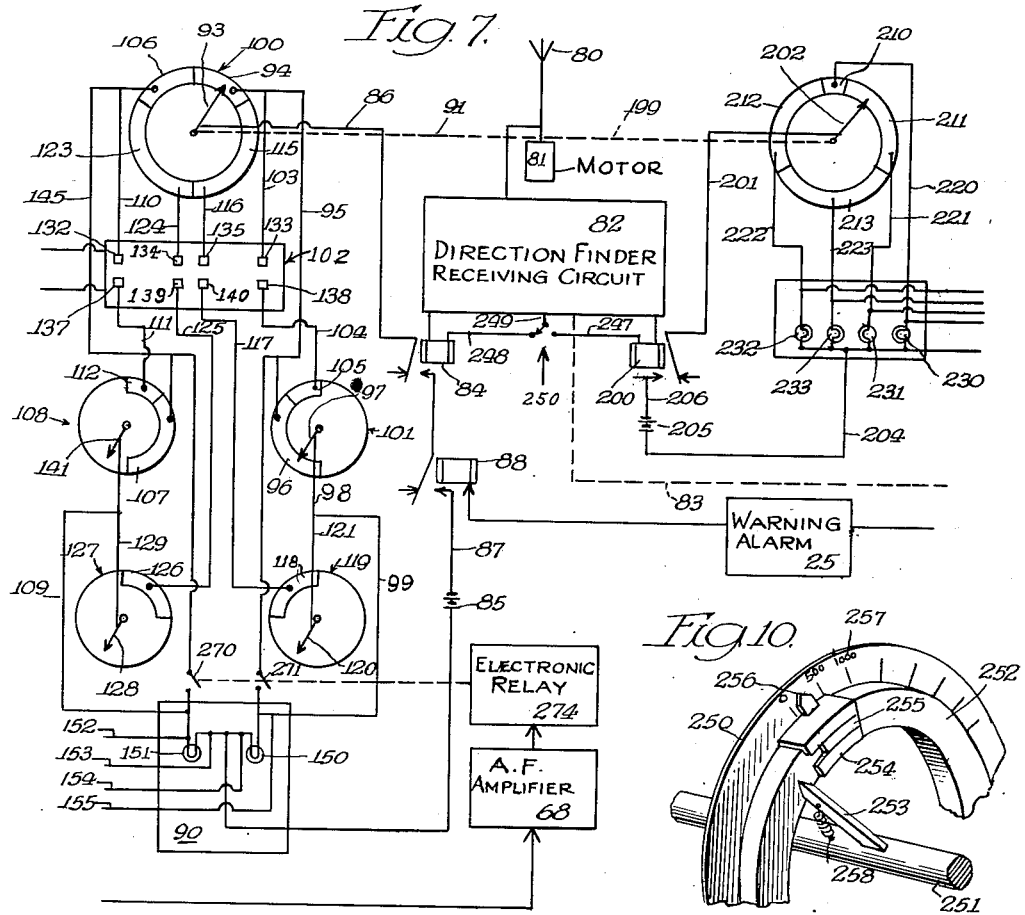
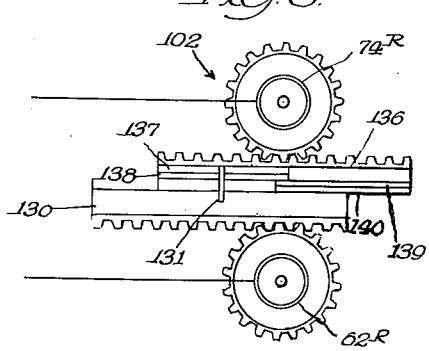
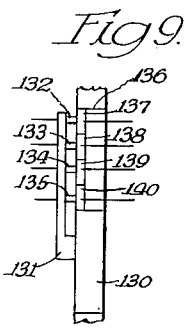
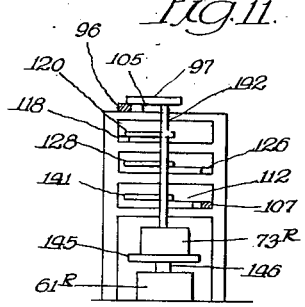
Inventor
Thomas A. Stansbury
By Clarence J. Loftus
atty Patented Sept. 18, 1951

2,568,568

UNITED STATES PATENT OFFICE 2,568,568

AIRCRAFT NAVIGATIONAL AID

Thomas A. Stansbury, Chicago, Ill.

Application March 10, 1947, Serial No. 733,500

16 Claims. (Cl. 250—2)

The present invention relates to navigational aids and particularly to electrical circuits, systems and methods for preventing collisions between aircraft, for preventing collisions between aircraft and tall buildings or natural obstructions, and for facilitating the blind landing of aircraft.

It is presently a matter of common knowledge that there are an excessive number of aircraft accidents due to faulty navigation and involving not only military craft but also commercial craft. The problem of accident prevention has become so acute as to be of major and universal concern to commercial airlines, federal and state aeronautical regulatory boards, legislative committees and the traveling public generally. The accident rate has become so high as to compel one of two conclusions: Either no solution to the problem of prevention has been found or attempted solutions have been discarded as commercially impractical.

It is an object of the present invention to provide an inexpensive and reliable system and method for detecting the presence of present and prospective obstructions in the path of an aircraft.

Another important object of the present invention is to provide a system having such operation that the pilot is informed as to the proper preventive measures to be taken to avoid such obstructions.

A further object is to provide a navigating system whereby each craft transmits a signal having a frequency indicative of its altitude, whereby signals transmitted by a given craft and signals received at that craft from another craft may be combined by a heterodyne process or otherwise to develop a control signal which is utilized to determine whether said other craft presents a collision hazard to said given craft.

Another object is to provide a navigating system whereby each craft transmits a signal having characteristics indicative of its speed, altitude and course, whereby such signals when received at a given craft from another craft may be utilized, together with signals indicating the relative bearing of such other craft, to determine whether said other craft presents a collision hazard to said given craft.

A basic object of this invention is to provide a frequency-comparison system whereby the presence of other craft at the same altitude level and presenting a collision hazard to a given craft may be indicated.

Still another object is to provide a sweep-receiver and coordinated indicating device (Figs. 3, 4) for utilizing signals representative of the heights of various obstructions to indicate to a navigator the presence of such obstructions.

Other objects are to provide a simple, reliable, low-cost navigating aid of the character set forth and to avoid the disadvantages and limitations of prior-art devices, to-wit: Excessive size and weight of equipment, requirements of specialized and highly-trained operators, eye strain hazards, requirement of highly-skilled maintenance personnel, difficulty in locating and repairing sources of service troubles, requirement of manual operation and high cost.

A primary object of the invention is to provide an arrangement whereby each craft or obstruction transmits a signal indicating the extent to which it presents a hazard to other craft, whereby each craft receives such signals from all other craft within range and utilizes them automatically to indicate to the pilot the presence of all such hazards, to warn him of an impending disaster, and to indicate to him the procedures to be followed in avoiding a collision.

Another important object is to provide a warning alarm system, wherein the occurrence of conditions which cause one craft to present a collision hazard to another also cause circuit portions to be set up in such a manner that the alarm is actuated when a hazard exists.

Still another object is to provide a simple, reliable unitary system which indicates to a pilot the presence of collision hazards and at the same time facilitates the keeping of the craft on a desired course to a landing field.

A further object of the invention is to provide a novel device for comparing the relative speeds of aircraft.

It is also an object of the invention to provide a simple, inexpensive computing device for indicating the presence of navigational hazards.

Other and further objects and advantages of the invention will become apparent from the following description of the accompanying drawings, in which there are illustrated what are at present considered to be the preferred embodiments of the invention.

In the drawings, Fig. 1 is a schematic block diagram of a preferred form of navigational aid in accordance with the invention, having such operation that the presence of a potential obstruction of comparable altitude is indicated to own craft; Fig. 2 is a schematic block diagram showing an alternative subcombination of relative altitude indicator and frequency responsive circuit suitable for use with the Fig. 1 embodiment; Fig. 3 is a front view of the all-altitude indicator included in the Figs. 1 and 6 embodiments; Fig. 4 is a side view of said all-altitude indicator, showing its circuit arrangements in schematic form; Fig. 5 is a front view of the relative altitude indicator shown in Figs. 1 and 6; Fig. 6 is a schematic block diagram of another preferred form of navigational aid in accordance with the invention, having such operation that the presence of a potential obstruction whose relative bearing, course, speed and altitude are such as to make it an impending hazard to own craft is computed and indicated to the pilot or automatic pilot by appropriate signals; Fig. 7 is a schematic diagram of a novel computing system suitable for use with the Fig. 6 embodiment; Figs. 8 and 9 are, respectively, front and side elevational views of the novel speed comparison device shown in Fig. 7; Fig. 10 is a perspective view of the switch 259 shown symbolically in Fig. 7 and Fig. 11 is an elevational view of the assembly including the switch 101, 108, 127, 119 symbolically shown in Fig. 7.

Referring now specifically to Fig. 1, there is illustrated in schematic form a complete comparative-altitude indicating system in accordance with the invention. The equipment therein shown is adapted to be carried by each aircraft operating in a given region, for example. In accordance with the invention I provide: Means (represented by the units 11—16) for generating a radio-frequency signal indicative of the altitude of the carrying airplane (hereinafter referred to as "own craft"); means (represented by the units 20—22) for sweeping through a band of frequencies cyclically successively to receive radio-frequency signals indicative of the altitudes of other airplanes within range, hereinafter referred to as "other craft;" means (represented by the units 17—19, 23) utilizing the generated signal and the received signals to produce a difference-frequency heterodyne control signal; and means (represented by the units 24—25) responsive to the control signal to indicate to the pilot that the altitudes of "own craft" and "other craft" are substantially the same, or to indicate what the difference between the altitudes is.

Unit 11 represents a conventional altimeter, preferably of the barometric type, and including a mechanical element, the position of which indicates the altitude of own craft. Units 12—16 translate this mechanical indication of altitude into a radio-frequency signal having a frequency indicative of altitude. The altimeter is ganged by any suitable mechanical expedient indicated symbolically by the dashed line 12 to the rotor of a variable tank-circuit condenser of a radio-frequency oscillator 13, whereby the frequency of the generated oscillations is functionally related to the altitude of own craft. The oscillator may be of the ultraudion or any other suitable type. The oscillator output circuit is coupled to an input circuit of a buffer amplifier 14 and an output circuit of this amplifier is coupled to an input circuit of a power amplifier 15, the output circuit of the latter being coupled to a suitable antenna or radiating system 16. There appears at the output terminals of amplifier 14 and there is propagated from antenna system 16 an R. F. signal having a carrier frequency $F_{OA}$ indicative of the altitude of own craft. As own craft ascends or descends, the altimeter 11 so varies the tuning of oscillator 13 as to cause $F_{OA}$ to increase or decrease.

Other craft within range of own craft are provided with equipment like units 11—16, whereby each of such craft transmits an R. F. carrier signal having a frequency $F_{DA}$ indicative of its altitude. Let is be assumed that three such craft are within range, and that they are transmitting signals $F_{DA1}$, $F_{DA2}$, $F_{DA3}$. If $F_{DA1}$ is near or equal to $F_{OA}$, the altitude of the first of such craft is such that it may be a hazard to own craft. In order to ascertain whether such a hazard is presented, I provide a receiving means periodically tuned through the band of frequencies including all frequencies transmitted by any craft within range. This means includes an intercepting or receiving antenna system 20, a tunable R. F. amplifier 21 having an input circuit coupled to the antenna, and a motor 22 suitably ganged to the rotor of amplifier tuning condenser for cyclically continuously varying the tuning of the amplifier 21 and sweeping the amplifier through the band of frequencies $F_{DA1}$, etc. The amplifier preferably includes a limiter, between the antenna and its tunable circuit for causing the amplifier output signal to be substantially independent of the amplitude or intensity of the signals intercepted by the antenna 20 and to be dependent on the frequency of those signals.

The system shown in Fig. 1 has such operation that the output of unit 24 is a maximum when $F_{OA}$ is equal to $F_{DA}$, that is, when another craft within range is at the same altitude as own craft. Were the output signals of amplifier 14 and amplifier 21 to be applied directly to mixer 23, the resultant difference-frequency output signal of mixer 23 would be of zero frequency when $F_{OA}$ is equal to $F_{DA}$. It is desirable that this resultant control signal have some assigned value such as $F_W$, under that condition. Accordingly there is provided a local oscillator 17 for producing a radio-frequency signal having a constant frequency of $F_W$, and first mixer 18. Mixer 18 has two input circuits, one of which is coupled to the output circuit of oscillator 17 and the other of which is coupled to an additional output circuit of amplifier 14. The output circuit of mixer 18 is coupled to the input circuit of an amplifier and filter unit 19, which passes only the difference-frequency signal resulting from the mixing of the signals $F_{OA}$ and $F_W$. This difference frequency-signal, having a frequency $F_{OA}-F_W$, is applied to an input circuit of mixer 23. The output signal of amplifier 21, having a frequency $F_{DA}$ is applied to another input circuit of mixer 23.

The means utilizing the generated signals ($F_{OA}$) and the received signals ($F_{DA}$) to produce a resultant signal comprises the units 17—19 and mixer 23. This resultant difference-frequency or heterodyne signal appears at the output of mixer 23. It has a frequency equal to $F_{DA}-(F_{OA}-F_W)$ or $F_{DA}-F_{OA}+F_W$.

Mixer 23 has an output circuit coupled to the means responsive to the last-mentioned heterodyne signal to indicate to the pilot that the altitudes of own craft and another craft are substantially the same, or to indicate what the difference in altitudes is. This means comprises a selective tuned amplifier unit 24 and a warning alarm 25. Unit 24 is tuned for maximum response or resonance to output signals of mixer 23 having a frequency $F_W$. Therefore the maximum response of unit 24 occurs when $F_{DA}-F_{OA}+F_W=F_W$, or when $F_{DA}-F_{AO}=0$, or when another craft within range is at the same altitude as own craft. Unit 24 develops a control signal which is used to control a frequency meter 26. When the frequency of the control signal is Fw, the meter indicates that the other craft is at the same altitude as own craft. When that frequency is less than Fw or greater than Fw the meter indicates that the other craft is below or above own craft.

Unit 24 has an output circuit coupled to a warning alarm unit 25. This alarm unit may comprise an electronic relay or any suitable device coupled to an output circuit of tuned amplifier 24 for energizing a lamp or furnishing an indication in response to a strong control signal from amplifier 24. This control signal is sufficiently strong to cause the lamp to be energized only when the difference-frequency heterodyne signal output of mixer 23 is equal or close to the resonant frequency of unit 24. The function of warning alarm unit 25 is to indicate to the pilot that strong signals of or near the frequency Fw are appearing in the output circuit of amplifier unit 24, whereby the operator knows that another craft has an altitude equal to or near that of own craft.

It will be noted that when the other craft is above own craft the frequency of the output signal of unit 23 is greater than Fw. When the other craft is below own craft, that frequency is less than Fw. In accordance with another feature of my invention I utilize this characteristic visually to indicate whether said other is above or below own craft.

Specifically, an output circuit of unit 24 is coupled to the input of a frequency meter included in a comparative altitude indicator 39. The meter is arranged to give a center indication when the output frequency of unit 24 is Fw. A suitable meter is shown in U. S. Patent No. 2,408,930, issued to L. Hammond et al. on October 8, 1946, for example. The meter proper, corresponding to Hammond's element 78 (Fig. 1), may be calibrated in terms of feet, the needle being set to furnish a center reading when the other craft is at the same altitude as own craft (in response to signals of frequency Fw), an "above" reading when the other craft is at a higher altitude (signal frequency greater than Fw) and a "below" reading when the danger craft is at a lower altitude (signal frequency less than Fw).

The rotor of the meter proper preferably carries a pair of light resilient contact arms 30, 31, connected to the negative terminal of a battery 32. Lamps 35 and 36 are located behind translucent arrow-shaped windows 37, 38 (Fig. 5). Contacts 30, 31 (Fig. 1) are so arranged relative to fixed arcuate contacts 33, 34, individually in circuit with lamps 35, 36, that lamp 35 is energized when the meter rotor turns counterclockwise and lamp 36 is energized when the meter rotor turns clockwise. Elements 32, 35, 36, 37, and 38 and the frequency-meter circuits are included in the housing of the relative altitude indicator 39, as shown in Fig. 5.

The system is so arranged that when another craft has an altitude close to that of own craft, the warning lamp of unit 25 is energized. The pilot then observes the arrow-shaped windows 37, 38 on relative altitude indicator 39. When the other craft is higher than own craft window 38 is illuminated. When the other craft is lower than own craft, window 37 is illuminated. The windows are shaped as arrows pointing in the direction of the level of the other craft. As indicated in Fig. 5, the meter dial and needle may be so placed in unit 39 that the pilot may conveniently observe both windows and meter needle.

As shown in Fig. 2, any suitable frequency responsive circuit 26, such as that shown in U. S. Patent No. 2,403,615 to R. C. Sanders, Jr., issued July 9, 1946, can be substituted for the unit 24 and a frequency meter 26 and employed to control any suitable relative altitude indicator, within the spirit of my invention.

It is desirable that the altitudes of all craft within range be ascertained, so that the pilot can know in a general way what the altitudes of other potential hazards are. Accordingly there is provided the indicator shown in Figs. 3 and 4. A warning lamp 40 is secured to a disc 41 (Figs. 3, 4) and the disc is mounted for rotation by shaft 42 of motor 22. This motor also drives the tuning condenser of unit 21 and sweeps the receiver through its frequency range while rotating lamp 40. The lamp rotates behind a circular peep 43 formed in panel 44 of the "all-altitude" indicator 45. Inscribed on the panel adjacent the peep are indicia of altitudes corresponding to the frequencies $F_{DA1}$, $F_{DA2}$, $F_{DA3}$, etc. to which unit 21 is successively tuned as the rotor of motor 22, the disc 41 and lamp 40 rotate in synchronism.

An electronic relay 46, generally similar to that included in warning alarm 25 is arranged in circuit between the lamp 40 and an output circuit of unit 21 in order to cause lamp 40 to be energized whenever strong signals are received by unit 21 (i. e. whenever unit 21 is instantaneously tuned to resonance with incoming signals). These signals have frequencies of $F_{DA1}$, $F_{DA2}$, etc. when other craft generating signals of those frequencies are in range. Lamp 40 accordingly flashes on for an instant as it passes the inscribed indicia corresponding to the altitude of those craft. Lamp 40 is, of course, coupled to relay 46 through appropriate brushes and slip-rings (not shown).

The operation of the above described system is as follows: There is radiated from the antenna 16 of own craft a signal having a frequency $F_{OA}$ indicative of its altitude. There are radiated from the like antennas of other craft within range signals having carrier frequencies $F_{DA1}$, $F_{DA2}$, $F_{DA3}$, etc., individually indicative of their altitudes. Motor 22 periodically sweeps receiving unit 21 through the band including all anticipated frequencies $F_{DA}$ and lamp 40 is rotated. Whenever unit 21 is instantaneously tuned to one of the frequencies of signals received from such other craft a strong signal appears in the output of unit 21, so that relay 46 is actuated to flash lamp 40, whereby the altitudes of all craft in the vicinity are displayed by indicating device 45.

When the frequency $F_{DA}$ of the received signals is near or equal to the frequency of the transmitted signals, the signal output of mixer 23 is near or equal to Fw and the response of tuned amplifier 24 is sufficient to actuate alarm 25, indicating the presence of a craft having an altitude near or equal to that of own craft. The action of relative altitude indicator 39 is then such as to indicate whether the craft presenting an immediate hazard is above or below own craft. It is, of course, within the spirit of this invention to utilize the output signal of unit 24 so to control an automatic pilot as automatically to change the altitude of own craft and to avoid the hazard.

Referring now to Fig. 6, there is shown a modified form of the invention having such operation that a second warning alarm 90 (Fig. 7) is actuated only when the craft presenting a hazard is at an altitude comparable to that of own craft and is flying with such speed and course and bearing that it is likely to collide with own craft. This form differs from the first embodiment shown in Fig. 1, wherein altitude only is considered in determining whether a craft presents a hazard. Those elements of the Fig. 6 embodiment like in structure and operation to corresponding elements shown in Fig. 1 have the same reference numerals, so that further description thereof is unnecessary herein. Similar elements have the same reference numerals primed. The Fig. 6 system comprises, in combination, a transmitter adapted to be carried by own craft for generating wave signals having a carrier frequency proportional to the altitude of own craft, means for developing modulating signals indicative of the speed and the course of own craft and alternately modulating them on said carrier signals, a receiver for receiving from another craft wave signals having a carrier frequency proportional to the altitude of said other craft and alternately modulated in accordance with the course and speed of said other craft, and means utilizing said first and second wave signals to indicate whether said other craft is a hazard to own craft.

There are modulated on the carrier signals $F_{OA}$ audio-frequency signals having frequencies $F_{OC}$ and $F_{OS}$ indicative of own craft's speed and course, respectively. Specifically, own craft carries a gyrocompass 50 ganged (as indicated by element 51) to the tuning condenser of an audio-frequency oscillator 52. The output circuit of this oscillator is coupled to a modulator unit 54 through one channel of an electronic switching unit 53. The modulator output circuit is coupled to a class C amplifier unit 15', which may be operated as a grid-bias modulated amplifier. A function of elements 50, 51, 52, 53, and 54 is to modulate on the generated carrier signal an audio-frequency signal having a frequency $F_{OC}$ indicative of own craft's course.

Own craft also carries a speed indicator 55, ganged (as indicated by numeral 56) to the tuning condenser of an audio-frequency oscillator 57. The output circuit of oscillator 57 is coupled to the modulator unit 54 through a second channel of switching unit 53. A function of elements 55, 56, 57, 53, and 54 is to modulate on the generated carrier signal an audio-frequency signal having a frequency $F_{OS}$ indicative of own craft's speed. The audio-frequency signals $F_{OS}$ and $F_{OC}$ are in different bands.

Switch 53 alternately opens one of its channels while blocking the other, whereby the course-indicating and speed-indicating signals are alternately modulated on the carrier wave output of oscillator 13.

It will be seen then that own craft transmits an R. F. signal ($F_{OA}$) indicative of its altitude, on which are alternately modulated A. F. signals ($F_{OC}$ and $F_{OS}$) indicative of its course and speed. It has been seen how the carrier signals may be compared to furnish a warning of the presence of craft at the same altitude level. In the Fig. 6 embodiment, I also utilize the audio signals $F_{OC}$, $F_{OS}$, $F_{DC}$ and $F_{DS}$ to furnish a warning of the presence of craft likely to collide with own craft.

In order to determine whether another craft is likely to collide with own craft, I employ a computing device 60. Own craft's course and speed data are supplied to the computing device by synchro generators of the Selsyn, Autosyn, or Teletorque type, hereinafter inferred to as a "synchro," designated by the numerals 61 and 62, and controlled, respectively, by the gyrocompass 50 and the speed indicator 55. Any suitable systems indicated by the dashed lines 63 and 64, respectively, may be employed angularly to position the synchro rotors in accordance with course and speed, respectively. The synchro generators are electrically connected to individual synchro receivers 61R and 62R (Figs. 8 and 11).

Other required data to be supplied to the computer 60 are speed and course of any craft at substantially the same altitude as own craft. For that purpose there is provided a super-heterodyne receiving circuit comprising the following cascaded units: antenna 20, radio-frequency amplifier 21, mixer 23, tuned amplifier 24', intermediate frequency amplifier 66, detector 67, and audio-frequency amplifier 68, the input circuit of intermediate frequency amplifier 66 being coupled to an output circuit of amplifier 24'.

The output circuit of audio-frequency amplifier 68 is coupled to two band pass filters 69 and 70. Filter 69 is designed to pass only the band of frequencies $F_{DC}$ (the frequencies of the audio signals modulated on the carrier signals transmitted by another craft and indicating the course of such craft). Filter 70 is designed to pass only the band of frequencies $F_{DS}$ (the frequencies of other audio signals modulated on the carrier signals transmitted by said other craft, said other audio signals indicating the speed of such craft).

Detector 67 derives the modulation components of the signal output of amplifier 24'. This signal output comprises a carrier (having a frequency which indicates the altitude of the other craft relative to own craft) and modulation components having audio frequencies which alternately indicate the speed and course of such other craft. The modulation components indicative of the speed of the other craft are applied, through band pass filter 70 to a frequency metering device 71. The modulation components indicative of the course of the other craft are applied, through band pass filter 69, to a frequency metering device 72. These metering devices may be similar to those shown in said U. S. Patent No. 2,408,930, or any suitable devices having rotors (such as that in element 78 of said patent) positioned in accordance with frequency may be used. The rotor of device 72 has sufficient inertia and such adjustment that it maintains its angular position during the alternate intervals of time when the electronic switch in the other craft (corresponding to switch 53) blocks off course signals from the oscillator of the other craft (corresponding to oscillator 52). Similarly the rotor of device 71 has sufficient inertia and such adjustment that it maintains its angular position during the alternate intervals of time when the carrier signals from the other craft are not being modulated in accordance with speed.

Metering devices 72 and 71 are used to control the positions of the rotors of synchro generators 73 and 74, respectively, any suitable control systems indicated by the dashed lines 75 and 76, respectively, being used for that purpose. Synchro generators 73 and 74 are electrically coupled to synchro receivers 73R and 74R, respectively (Figs. 8 and 11). A function of amplifier 66, detector 67, amplifier 68, filter 69, meter 72, and synchro 73 is to derive the modulation components (in one band) of the signals received from the other craft (said components having an audio frequency indicative of the course of the other craft) and to transmit to the computer 60 a signal indicative of that course. To that end, the rotor of synchro generator 73 is angularly positioned in accordance with such course. A function of units 66, 67, 68, filter 70, meter 71, and synchro generator 74 is to derive the modulation components (in the other band) of the signals received from the other craft (said components having an audio frequency indicative of the speed of the other craft) and to transmit to the computer 60 a signal indicative of that speed. To that end, the rotor of synchro 74 is angularly positioned in accordance with such speed.

In Fig. 7 there is shown a device for determining whether another craft presents a hazard to own craft comprising a warning alarm, a source of energy therefor, normally open circuit portions between said source and said alarm, means for closing one of said circuit portions when said other craft is at substantially the same altitude as own craft, and computer means for closing other of said circuit portions when the speeds, courses, and bearing of both craft are such that said other craft is a collision hazard with respect to own craft. The computing device 60 is schematically shown in Fig. 7.

It has been seen how the Fig. 1 system is employed to warn the pilot of own craft of the presence of another craft at the same general level of altitude. It has also been seen how, when the presence of such craft at that altitude is indicated, the Fig. 6 system furnishes other craft speed and course data to the computer. One other datum must be submitted to the computer 60, in order to determine whether the other craft is a great collision hazard with respect to own craft, to-wit: Relative bearing of other craft.

The relative bearing datum is furnished by a direction finder included in computer 60. This direction finder includes a rotating antenna 80, driven by a motor 81, and an appropriate tunable receiving unit 82. The receiving unit 82 has a tuning condenser ganged to motor 22, as indicated by the dashed line 83. The function of units 80, 81, 82 is to furnish a strong signal whenever: (1) the instantaneous orientation of antenna 80 is such that another craft lies within its directional pattern and (2) the receiver 82 is tuned to the carrier frequency $F_{DA}$ of the signals transmitted by that craft. Unit 82 is a sweep-receiver, tuned through the band of frequencies $F_{DA}$ in synchronism with the tuning of amplifier 21. The rate of variation of tuning of unit 82 is high with respect to the rate of rotation of antenna 80 (Fig. 7).

The output signal of receiver 82 is used to close the contacts of a relay 84 and set up or close a portion of a warning alarm circuit including a battery 85 and conductors 86, 87. The last-mentioned circuit actuates a warning alarm 90 only when three contingencies are fulfilled: (1) the frequency $F_{DA}$ of the signals transmitted from other craft and the frequency to which receiver 82 is tuned are substantially the same; (2) the relative bearing of the other craft, its course and speed are such that it presents an impending peril to own craft; (3) both of the craft are at substantially the same altitude.

As stated above, the output signal of receiver 82 is used to close the contacts of a relay 84 and to set up a portion of warning alarm circuit including a battery 85, conductors 86 and 87 and another relay 88. This circuit is so arranged that other circuit portions including the contacts of relay 84 must be closed before the warning alarm 90 is actuated. This arrangement assures that the warning alarm will not be actuated unless a strong signal of the frequency $F_{DA}$ is received by receiver 82. Nor will the warning alarm be actuated unless the other craft is at approximately the same altitude as own craft. To provide for this altitude condition I include in the warning alarm circuit 90, 85, 86, 87 the contacts of an additional relay 88. Relay 88 is coupled to the warning alarm 25 in such manner that its contacts are closed only when the other craft is at substantially the same altitude as own craft. Warning alarm 25 has an output circuit coupled to the relay 88 in any suitable manner for causing it to perform this function. The operation of relay 84 is such that its contacts can be closed only when antenna 80 is directed on the other craft. The contacts of relay 84 are open when the antenna is at all other angular positions and when the receiver 82 is not tuned to the frequency $F_{DA}$ of the signals from the other craft. Since the frequency to which receiver 82 is tuned is varied in synchronism with the frequency to which amplifier 21 is tuned the operation of the circuit of warning alarm 90 is such that relays 84 and 88 will be closed only when a craft at a dangerous altitude is supplying relative bearing information to the computer. At all other times the warning alarm 90 circuit is opened by the open contacts of one or both of these relays.

Whether or not a craft flying at the same altitude as own craft will be a collision hazard depends on the following factors: Relative bearing, course and speed.

In accordance with the invention I have provided a very simple system for determining, with sufficient accuracy for commercial purposes, and through the use of simple and inexpensive equipment, whether or not such a craft presents an immediate hazard.

The description of this system will be simplified if it be presently assumed that own craft is flying, tracking, and heading true north. Under that assumed condition craft at the same attitude as own craft and having the following relationships with respect to own craft present navigational hazards:

| Relative Bearing of Other Craft | True Course of Other Craft | |
|---|---|---|
| | When speed of own craft slower than that of other craft | When speed of own craft equal to or greater than that of other craft |
| Degrees<br>0- 60<br>300- 0<br>60-180<br>180-300 | Degrees<br>180-315<br>----------<br>45-180<br>----------<br>270-360<br>0- 90 | Degrees<br>180-315<br>315-360<br>45-180<br>0- 45 |

The computer is so arranged that warning alarm 90 is actuated or energized only when one of the following six events occurs and when all conditions necessary for the occurrence of one of those events are satisfied:

(a) Bearing of other craft 0° to 60° and course of other craft 180 to 315°.

(b) Bearing of other craft 0° to 60° and course of other craft 315° to 360° and speed of own craft equal to or greater than that of other craft.

(c) Bearing of other craft 300° to 0° and course of other craft 45° to 180°.

(d) Bearing of other craft 300° to 0° and course of other craft 0° to 45° and speed of own craft equal to or greater than that of other craft.

(e) Bearing of other craft 60° to 180° and course of other craft 270° to 360° and speed of own craft slower than that of other craft.

(f) Bearing of other craft 180° to 300° and course of other craft 0° to 90° and speed of own craft slower than that of other craft.

I utilize these facts to provide a device for determining whether another craft presents a hazard to own craft comprising a warning alarm, a source of energy therefor, circuit portions between said source and said alarm, means for closing one of said circuit portions when said other craft is at substantially the same altitude as own craft, directional receiver means on own craft for closing another of said circuit portions when taking a relative bearing indication on a said other craft and when said other craft is at the same altitude as own craft, means on own craft for closing other of said circuit portions representative of the relative speed, relative bearing and relative courses of both said craft, all the aforesaid circuit portions being so arranged that said alarm is connected to said source and energized when all conditions required to make said other craft a collision hazard to own craft are satisfied, at least one of said circuit portions being open to deenergize said alarm when all of said conditions are not satisfied.

In accordance with the invention the operation of warning alarm 90 is made contingent upon the setting up of circuit portions in series with battery 85. It has been seen how certain conditions must be satisfied before one of the above-mentioned events (a) to (f) occurs. Circuit portions are set up by closing contacts as these conditions are satisfied. When all conditions required for the occurrence of one of the events (a) to (f) are satisfied, an energizing circuit between battery 85 and alarm 90 is closed.

In order to set up circuit portions representative of the relative bearing conditions there is provided a rotary contact arm 93 which is driven in synchronism with antenna 80. This contact arm successively touches segments 94, 115, 123 and 106, having arcuate lengths appropriate to represent the relative bearing sectors, 0°–60°, 60°–180°, 180°–300°, and 300°–0°, respectively. The circuit portions representing relative bearing conditions are, accordingly, set up as contact 93 rotates in synchronism with the antenna.

In order to set up circuit portions representative of the course conditions there are provided four rotary contact arms 97, 141, 128 and 120. Arm 97 can bear on contacts 96, 105, having arcuate lengths appropriate to represent the course sectors 180°–315° and 315°–360°, respectively. Arm 141 can bear on contacts 107, 112, having arcuate lengths appropriate to represent the course sectors 45°–180° and 0°–45°, respectively. Similarly, the segments 126 and 118, associated with arms 128 and 120, respectively, represent the course sectors 0°–90° and 270°–360°, respectively. All four arms are positioned in accordance with the course of other craft, as will be explained hereinafter. The circuit portions representing course conditions are accordingly set up as the arms are positioned.

The speed comparison device 102 sets up certain circuit portions when the speed of own craft is slower than that of other craft, other circuit portions when the speed of own craft is greater than that of the other craft, and both of said circuit portions when the speeds are equal.

Let it be assumed, in order to illustrate the principle on which these contacts are arranged, that the relative bearing of the other craft is between zero and 60°. Under that assumed condition contact arm 93 is in contact with segment 94, having an arcuate length of 60° extending clockwise from the center line of own craft. Segment 94 is connected by a conductor 95 to a segment 96 of a switch 101 including rotary contact arm 97. The segment 96 has an arcuate length extending from 180° to 315° and its arm 97 is positioned, as has been stated, in accordance with the course of the other craft. Contact 97 is connected by conductors 98 and 99 to one input circuit of warning alarm 90. The other input terminal of this warning alarm circuit is connected to battery 85. The switch 100, including segment 94 sets up a circuit portion when the bearing condition is satisfied. The switch 101, including the segment 96, sets up another circuit portion when the course condition is satisfied. By making segment 94 of a length corresponding to the 0°–60° sector and by making segment 96 of a length corresponding to a 180°–315° course I close the energizing circuit from battery 85 to warning alarm 90 whenever the required conditions are satisfied so that the first-mentioned event (a) occurs.

Additionally, I provide a speed comparison device 102 which has such operation, hereinbelow fully explained, as to indicate whether or not the speed of own ship is slower than or at least equal to that of the other craft. A conductor 103 connects segment 94 to contact 133 of this device and a conductor 104 is connected between terminal bar 138 of the speed comparison device 102 and a segment 105 on switch 101. Segment 105 is of such a length that it corresponds to 315° to 360° courses of the other craft. The speed comparison device 102 and the segment 105 are so constructed and arranged that an energizing circuit to warning alarm 90 is completed through battery 85, conductor 87, the contacts of relays 88 and 84, conductor 86, contact arm 93, segment 94, conductor 103, contacts 133 and 138 of speed comparison device 102, conductor 104, segment 105, contact arm 97, conductor 98, conductor 99 and warning alarm 90 whenever the second above-mentioned event (b) occurs. When the speed of own craft is less than that of another craft on a course between 315° and 360° the speed comparison device 102 breaks the last-mentioned circuit by breaking contacts 133, 138.

When event (c) occurs segment 106 of switch 100 (extending from 300° to 360°), segment 107 of switch 108 (extending from 45° to 180°), conductor 109, conductor 145 and arm 141 have such operation that they close an energizing circuit from battery 85 to warning alarm 90.

When event (d) occurs segment 106 of switch 100, conductor 110, contacts 132 and 137 of speed comparison device 102, conductor 111, contact arm 141 and segment 112 of switch 108 (extending from 0° to 45°) and conductor 109 close an energizing circuit to warning alarm 90. However, if all conditions for event (d) are satisfied other than the speed requirement, then speed comparison device 102 breaks contacts 132, 137, leaving open the circuit for warning alarm 90.

Let it now be assumed that the other craft is flying in the sector between 60° and 180° relative bearing. Under that assumed condition contact arm 93 of switch 100 is in contact with a segment 115, having an arcuate length and arrangement corresponding to that sector. Segment 115 is connected by conductor 116, contacts 135 and 140 of speed comparison device 102 and conductor 117 to a segment 118 of a switch 119 (the segment extending from 270° to 360°), the rotating contact arm 120 of which is connected by conductors 121 and 99 to an input terminal of warning alarm 90.

When condition (e) exists, an energizing circuit to the warning alarm is closed through battery 85, conductor 87, the contacts of relays 84 and 88, conductor 86, contact arm 93, segment 115, conductor 116, contacts 135, 140 of speed comparison device 102, conductor 117, segment 118, contact arm 120, conductor 121, conductor 99, and warning alarm 90. Switch 119 is so arranged that segment 118 extends over an angle between 270° and 360°. Should all the conditions necessary for the occurrence of event (e) be satisfied except the speed requirement, then speed comparison device 102 breaks the circuit between contacts 135 and 140, so that the warning alarm 90 will not be actuated.

The construction and operation of segment 123 of switch 100, conductor 124, contacts 134, 139, conductor 125, segment 126 of switch 127, contact arm 128, and conductors 129 and 109 during the occurrence of condition (f) will be apparent from the foregoing description.

It will be observed that the orientation of contact arm 93 in synchronism with antenna 80 and the arrangement of the segments of switch 100, to correspond to the relative bearing sectors, provide positional or relative bearing data. The speed comparison device 102 provides the required relative speed datum. The rotary contact arms of switches 101, 108, 127 and 119 are always positioned, by means hereinafter to be explained, in accordance with the true course of the other craft. Since the segments of those four switches are arranged to correspond with the various course ranges above mentioned those four switches provide course data to the computing device.

The speed comparison device ascertains whether the speed of own craft is slower than that of the other craft or is at least equal to that of the other craft and sets up appropriate circuit portions. To that end I provide a rack 130 of suitable insulating material and slidably mount it in a suitable guide (not shown) so that it is positioned by a pinion gear controlled by own craft speed synchro receiver 62R (see Fig. 8). This rack carries a support 131 on which are mounted the above-mentioned four contacts 132, 133, 134 and 135. Other craft speed synchro 74R controls a pinion gear which positions a rack 136 having contact bars 137 and 138 mounted alongside its forward half and contact bars 139 and 140 mounted alongside its rear half. The operation of the speed comparison device is such that when the other craft speed is equal to that of own craft racks 136 and 130 are in registry throughout and contacts 132, 133, 134 and 135 touch contacts 137, 138, 139 and 140, respectively. When the speed of own craft is slower than that of the other craft, then rack 136 moves ahead of rack 130 and contacts 134 and 135 are in contact with bars 139 and 140. When the speed of own craft is equal to or greater than that of the other craft, then contacts 132 and 133 are in contact with bars 137 and 138, respectively. Synchro 62R turns counterclockwise with increasing speed of own craft. Synchro 74R turns clockwise with increasing speed of other craft.

The computing device of Fig. 7 has, for purposes of illustration, been explained on the supposition that own craft was heading true North. In order to provide for its operation when the plane is heading in other directions and in order to orient the contact arms of switches 101, 108, 127 and 119 in accordance with the true course of the other craft I mount the contact arms 97, 120, 128 and 141 on a shaft 142 angularly positioned by the other craft course synchro receiver 73R. The supporting base 145 of the other craft course indicating synchro 73R is mounted for rotation on a shaft 146 of own craft course indicating synchro 61R. This arrangement accomplishes the desired orientation of those four contact arms, whereby they point in the direction of the true course of the other craft. It is appreciated that follow-up systems for maintaining the desired orientation of the switch arms may advantageously be employed. Follow-up systems are per se well-known to the art and need not be described herein.

The warning alarm 90 may comprise a pair of lamps or gongs or any suitable devices for making an indication to the pilot that own craft is in impending peril of collision with another craft. Preferably a lamp 150 is placed in circuit between conductor 99 and battery 85, to flash and indicate to the pilot that he should bank to the left, and a lamp 151 is placed in circuit between conductor 109 and battery 85 to indicate that a turn to right is the prescribed remedial procedure for avoiding the other craft. Conductors 152, 153, 154, 155 can be connected to an automatic pilot in order automatically to make the required turns.

It will be seen that one principle upon which the computer operates is that of electrically simulating the conditions which must exist before one of the above-mentioned events (a) to (f) can occur. The operation of the warning alarm is made contingent upon the setting up of circuits at various points. As the several conditions are found to exist the circuits are set up. When all the conditions necessary for one of the events takes place, the warning alarm circuit is closed. This arrangement has important advantages. First, the speed and course and bearing data are not employed to calculate with precision whether own craft can miss another craft by a hair's breadth. They are employed to indicate that the general conditions are such that the other craft is an impending hazard. The system is based on reasonable approximations which give results satisfactory for practical commercial operation. For example, another craft at the same altitude as own craft, flying a course 270°, relative bearing 15°, will cause the warning alarm 90 to be actuated in the same manner as another craft at the same altitude as own craft, flying a course 190°, relative bearing 30°. In either case, it is known that a left turn of own craft will enable own craft to avoid other craft. Second, the difference between the speeds of own craft and other craft are not measured with precision. Speed comparison device 102 simply indicates whether own craft's speed is less than or at least equal to other craft speed. For example, another craft having a relative bearing 150°, flying course 280°, will cause the warning alarm 90 to be actuated whenever the speed of own craft is slower than that of other craft, no matter how much slower that speed might be. This principle of reasonable approximations permits the use of very inexpensive and simple computing equipment.

Thus it will be seen that I have provided, in combination, a transmitter adapted to be carried by own craft for generating wave signals having a carrier frequency proportional to the altitude of own craft, means for developing modulating signals indicative of the speed and the course of own craft and alternately modulating them on said carrier signals, a receiver for receiving from another craft signals having a carrier frequency proportional to the altitude of said other craft and alternately modulated in accordance with the course and speed of said other craft, a warning alarm coupled to an energizing source through several circuit portions, means for mixing both carrier signals to derive a resultant carrier signal, means responsive to said resultant carrier signal when said altitudes are substantially equal for closing one of said circuit portions, means included in said receiver for deriving and separating said modulation components so indicative of the speed and course of said other craft, means including synchros controlled by the modulating signal indicative of the speed of own craft and synchros controlled by the modulation components indicative of the speed of said other craft for closing another of said circuit portion, means including synchros controlled by the modulating signal indicative of the course of own craft and synchros controlled by the modulating signal indicative of the course of the other craft for closing still other of said circuit portions, and a directional receiver for closing a further one of said circuit portions, said circuit portions being so arranged that all are closed to energize said warning alarm when the altitude, speed, relative bearing and course of said other craft are such as to make it a collision hazard with respect to own craft.

It will be seen that my invention provides a very simple method and arrangement whereby a pilot is informed of the presence of collision hazards presented by other aircraft and is furnished with indications as to the proper remedial procedure.

In accordance with another feature of my invention I provide the homing device illustrated in Fig. 7 and a switching arrangement illustrated in Fig. 10 whereby the pilot may be informed of the presence of collision hazards and may at the same time utilize the homing device. Thus he can not only find his way to a desired landing field but can also at the same time avoid other craft flying in the vicinity of that field. Specifically, the rotating antenna 80 is ganged, by any suitable expedient indicated by the dashed line 199 to a rotating contact arm 202 of a switching device which comprises circularly arranged conductive segments 210—213. These four conductive segments are connected to conductors 220—223, respectively, each of which is in turn connected to one terminal of individual lamps 230—233, respectively. The other lamp terminals are connected by a conrductor 204 to a battery 205 and the remaining battery terminal is connected, through the normally open contacts of a relay 200 and a conductor 201 to contact arm 202. The contact arm 202 rotates in synchronism with the antenna 80.

A transmitter is located at the landing field or other location which it is desired to home on, said transmitter generating a carrier wave of a frequency which is indicative of its altitude above sea level. This transmitter may either be an aircraft equipped with a transmitter and gear previously described or it may be a transmitter alone which generates only the required carrier wave indicative of its altitude above sea level. Such a carrier wave is received by the direction finder receiver circuit whenever the director antenna is directed toward that transmitter.

The signals $F_{DA}$ generated by the transmitter at the landing field have a lower carrier frequency than the signals $F_{DA}$ generated by other craft which may be flying in the vicinity. It has been indicated that the receiver 82 is periodically swept through the whole range of frequencies $F_{DA}$ by reason of the operation of ganging expedient 83 and motor 22. I so arrange relays 84 and 200 that relay 84 is actuated in response to signals having a carrier frequency above that of the signals generated by the transmitter at the field and so that relay 200 is actuated in response to signals having a frequency equal to the carrier frequency of signals generated at the landing field.

Specifically, I provide the special switching device as shown in Fig. 10, which allows all signals $F_{DA}$ of a carrier wave frequency less than an arbitrarily-set level (which is set manually to be slightly higher than the frequency of the transmitter at the landing field) to actuate relay 200. All signals from aircraft in flight and constituting collision hazards will cause relay 84 to operate in order to prevent aerial collision. At the same time, the signal from the transmitter at the landing field actuates relay 200 and its homing circuit, thereby allowing the pilot of own craft to home on it. When relay 200 is closed by the reception of such a signal, a circuit is completed through conductor 204, battery 205, conductor 206, the relay contacts, conductor 201, contact arm 202, and one of the four following groups of units:

(a) Segment 210, conductor 220, and lamp 230.
(b) Segment 211, conductor 221, and lamp 231.
(c) Segment 212, conductor 222, and lamp 232.
(d) Segment 213, conductor 223, and lamp 233.

Contact arm 202 is ganged with the shaft of directional antenna 80 and thereby rotates with it and indicates the direction from which the antenna is receiving signals. If own craft is heading approximately directly toward the desired homing transmitter on the landing field, the contact arm 202 will be resting on and making contact with segment 210 when relay 200 closes, thereby completing the circuit through circuit (a) above, which actuates lamp 230 to show that own craft is on course toward the homing transmitter. If own craft is heading on some course which will carry own craft to the left of the homing transmitter, the contact arm 202 will be resting on and making contact with segment 211 when relay 200 closes, thereby completing the circuit through circuit (b) above, which actuates lamp 231 to show that own craft must turn to the right in order to arrive on a course which will carry it direct to the transmitter. Similarly, if own craft is heading on some course which will carry it to the right of the homing transmitter, circuit (c) above is closed and lamp 232 shows that own craft must be turned to the left in order to arrive at a course which will carry it directly to the transmitter. If the transmitter is in the general area behind own craft, contact arm 202 will be resting on and making contact with segment 213 when relay 200 closes; the relay then closes circuit (d) above and actuates lamp 233 showing that the transmitter has been passed and is behind own craft. It will be seen that the lamps inform the pilot that the homing transmitter is directly ahead, or that the transmitter is behind own craft, or that he must bank to the right or left to come to a desired course. Conductors 220, 221, 222, 223, and and 204 can be connected to an automatic pilot device of the type that will automatically make all the required turns necessary to keep the craft on its course toward the transmitter of the landing field.

Referring to Fig. 10, which is a perspective view of the switching arrangement indicated by the numeral 250 in Fig. 7, the shaft 251 is turned by motor 22, which also rotates the variable condensers of the direction finder receiver circuit (see 83, Fig. 7). Circular conductor 252 (only one quadrant shown broken away) is stationary and centered around the rotating shaft 251. Contact arm 253 is rigidly attached to and rotates with shaft 251. Spring 258 holds the contact arm 253 against circular conductor 252. Conductor 249, which is connected to an output terminal of the direction finder receiver 82 is connected to contact arm 253. Circular conductor 252 is connected by conductor 248 to relay 84. Therefore, as long as contact 253 is in contact with circular conductor 252 any strong signal output of the direction finder receiver will cause relay 84 to close.

Insulating segment 254 slides on circular conductor 252 and is so placed that it covers a portion of the circular conductor. Conductor 255, which is imbedded in the front surface of segment 254 and insulated by the segment from circular conductor 252, is connected to relay 200 by conductor 247. When contact arm 253 contacts segment 254 it is forced off of the circular conductor 252 and onto the conductor 255. While contact arm 253 is touching conductor 255 an incoming signal will cause relay 200 to operate instead of relay 84. The pilot knowing or having ascertained the altitude above sea level of his desired landing field, manually sets the pointer 256 of segment 254 against the proper graduation on dial 257, correspondnig to the altitude of the landing field above sea level; this procedure so positions segment 254 that contact arm 253 touches conductor 255 when the positions of shaft 251 and the tuning condensers of the receivers 82 and 21 are such that they are receiving signals having a frequency indicative of the altitude above sea level of the landing field (or any lower altitude). The contact arm touches circular conductor 252 when the positions of shaft 251 and the condensers are such that they are receiving signals having frequencies indicative of all altitudes greater than that of the designated landing fields. Therefore, it may be seen that when pointer 256 is properly set to the altitude of the desired landing field, the signals from the transmitter of the landing field will actuate relay 200 while at the same time all signals from aircraft in flight over the area of the landing field will actuate relay 84, thereby allowing the automatic pilot device or the actual human pilot to home on the transmitter of the landing field while at the same time to avoid all obstructions to navigation such as other aircraft in flight. This system gives the pilot all the information required for making a safe blind landing on a busy field.

My navigational aid is of utility in indicating to a pilot the presence of stationary terrestrial obstructions such as mountains, tall structures and the like. A plurality of transmitters such as 11—16 (Figs. 1 or 6) may be provided at or near such an obstruction. Let it be assumed that a building 600 feet in height on a foundation 100 feet above sea level constitutes a hazard to navigation. The transmitters transmit signals of frequencies indicative of altitudes in steps of a predetermined number of feet (for example, steps of 200 feet), increasing from zero altitude (sea level) up to and including the maximum altitude of the obstruction. Transmitters provided for this obstruction simultaneously transmit signals of frequencies indicative of the following altitudes: 200', 400', 600', and 700'. Therefore, the presence of this obstruction in the vicinity of own craft will be indicated on the all-altitude indicator 45 as substantially a solid line of light produced by flashes of lamp 40 from zero altitude to 700 feet of altitude. If our craft is at an altitude above sea level of 700 feet or less or at an altitude in the close vicinity of 700 feet, the signals from this transmitter will cause warning alarm 25 to be actuated. When a plurality of transmitters are so used to indicate the presence of a building (for example), the Figs. 6–7 system requires relative bearing data from the building but not course and speed data. The output signals from amplifier 68 will have zero amplitude, since no course and speed modulation components are then derived. Moreover, switches 101, 108, 127, 119 need not be used and should be shorted out. For this purpose I include shorting switches 270, 271 (Fig. 7) in the circuits between conductors 95, 99 and 145, 109, respectively. These switches are normally open but are ganged and so controlled by an electronic relay 274 that they are closed, whenever the output of amplifier 68 is zero. These switches then short out switches 101, 108, 127 and 119. Under these conditions segments 106 and 94 supply the desired relative bearing data. Relays 84 and 88 close their contracts when such an obstruction is at substantially the same altitude as own craft and has a relative bearing between 300° and 0° or 0° and 60°. The lamps 150 and 151 function, as indicated above, to indicate whether the pilot should turn to the right or left. Of course the stationary object transmitters need not be set on top of the obstruction or even on the obstruction, but must be placed in the vicinity of the stationary obstruction so it will appear, for all practical purposes, to be in the center of the location of the obstruction. In the cases of mountainous regions or ranges, a number of transmitting systems should be placed along the regions or range at appropriate intervals so as to warn an aircraft if it should be heading for any obstructions at an insufficient altitude.

Thus it will be seen that the invention provides simple, reliable means and methods for indicating to own craft the presence of hazards to navigation and for prompting the taking of appropriate remedial measures.

While there have been shown and described what are at present considered to be the preferred embodiments of the present invention, it will be obvious to those skilled in the art that various changes and modifications may be made therein without departing from the true scope of the invention. For example, the conditions necessary for the occurrence of the events (a) through (f) may vary in practice, requiring variations in the arcuate lengths of the various segments of the switches 108, 101, 127 and 119. Such variations are within the scope of this invention, a practical embodiment being herein disclosed in full. It is, accordingly, intended in the appended claims, to cover all such changes and modifications as fall within the true scope of the invention and outside of the prior art.

I claim:

1. The combination of an altimeter adapted to be carried by a craft, a high-frequency wave-signaling device controlled by said altimeter for radiating carrier waves having a frequency indicative of altitude, a speed measuring device, and means controlled by said device for modulating on said carrier waves other signals having a frequency indicative of the speed of said craft.

2. A navigational aid comprising an altimeter adapted to be carried by a craft, a high-frequency wave-signaling device controlled by said altimeter for transmitting carrier waves having a frequency indicative of altitude, a compass, means controlled by said compass for modulating on said carrier-wave signals having a frequency indicative of the course of said craft, a speed-measuring device and means controlled by said device for modulating on said carrier wave signals having a frequency indicative of the speed of said craft, and switching means for alternately rendering operative said modulating means.

3. A system for indicating the presence of a navigational hazard to an aircraft comprising a transmitter adapted to be carried by said aircraft for generating signals having a frequency varying with the altitude of said craft, a sweep receiver adapted to be carried by said aircraft for receiving signals transmitted from said hazard and having a frequency varying with the altitude of said hazard, converter means for combining said generated and received signals to derive resultant signals having a frequency varying in accordance with the difference between said altitudes, frequency-responsive means for indicating said difference, and means controlled by said frequency-responsive means for indicating whether the hazard is above or below said aircraft.

4. A system in accordance with claim 3 wherein the last-mentioned means comprises a pair of lamp circuits and contacts controlled by the frequency-responsive means for closing one of said circuits when the hazard is above said aircraft and the other of said circuits when the hazard is below said aircraft.

5. A system in accordance with claim 4 and including a pair of translucent arrow-shaped windows pointing upwardly and downwardly, respectively, said windows and lamps being so arranged as to indicate to an operator whether said hazard is above or below own craft.

6. A system for indicating the presence of a navigational hazard to an aircraft comprising a transmitter adapted to be carried by said aircraft for transmitting signals having a frequency varying with the altitude of said craft, mixer means for heterodyning said signals to another frequency, a sweep receiver adapted to be carried by said aircraft for receiving signals transmitted from said hazard and having a frequency varying with the altitude of said hazard, converter means for combining said received and heterodyned signals to derive resultant signals having a frequency varying in accordance with the difference between said altitudes, a tuned circuit having an input to which said resultant signals are applied and having a maximum response when said difference is zero, and means coupled to said tuned circuit for indicating said difference.

7. A system for indicating the presence of an impending navigational hazard to an aircraft comprising a transmitter adapted to be carried by said craft for generating signals having frequency characteristics indicative of the altitude, speed and course of said craft, a receiver adapted to be carried by said aircraft for receiving other signals transmitted from another craft and having frequency characteristics indicative of the altitude, speed and course of said other craft and means utilizing both said signals to furnish an indication whether the last-mentioned craft is a navigational hazard to the first-mentioned craft.

8. A system for indicating the presence of a navigational hazard to an aircraft comprising a transmitter adapted to be carried by said craft for generating signals having a carrier frequency indicative of the altitude of said craft and modulation components having frequencies indicative of the speed and course of said craft, a receiver adapted to be carried by said aircraft for receiving other signals transmitted from another craft and having a carrier frequency indicative of the altitude of said other craft and modulation components having frequencies indicative of the speed and course of said other craft, and means utilizing both said signals to furnish an indication whether said other craft is a navigational hazard to the first-mentioned craft.

9. A system for indicating the presence of a navigational hazard to an aircraft comprising a transmitter adapted to be carried by said craft for generating signals having characteristics indicative of the altitude, speed and course of said craft, a receiver carried by said craft for receiving other signals transmitted from another craft and having characteristics indicative of the altitude, speed and course of said other craft, a directional receiver for indicating the relative bearing of said other craft and means utilizing both said signals and the output of said directional receiver to indicate whether said other craft is a navigational hazard to the first-named craft.

10. In combination, a transmitter adapted to be carried by a craft for generating wave signals having a carrier frequency proportional to the altitude of said craft, means for developing modulating signals having frequencies indicative of the speed and the course of said craft and alternately modulating them on said carrier signals, a receiver for receiving from another craft wave signals having a carrier frequency proportional to the altitude of said other craft and alternately modulated in accordance with the course and speed of said other craft, and means utilizing said first and second wave signals to indicate whether said other craft is a hazard to the first-named craft.

11. In combination, a transmitter at a landing field for generating wave signals having a frequency indicative of the altitude of the field, a homing receiver carried by a craft and responsive to said signals for guiding said craft to said field, means including a sweep receiver carried by said craft and responsive to signals transmitted from another craft and having frequencies proportional to their altitudes for indicating when said other craft is a navigational hazard, and means synchronized with said sweep receiver for making said homing receiver responsive to the first-mentioned signals and said sweep receiver responsive to the second-mentioned signals.

12. In a system for indicating the presence of navigational hazards to aircraft of the type comprising a plurality of transmitters individually adapted to be carried by individual ones of said craft for generating signals having characteristics indicative of the individual altitudes, speeds and courses of said craft, a receiver adapted to be carried by one of said craft for receiving the signals transmitted from the other craft, and means utilizing both said received signals and the signals generated at said one craft to furnish an indication whether any of said other craft is a navigational hazard to said one craft.

13. In a navigational system of the character described, an electrically operable warning alarm for indicating the presence of another craft constituting a hazard to own craft, and computer means for rendering the operation of said warning alarm contingent upon the satisfaction of conditions which render said other craft a potential hazard, said computer means comprising a source of energy for said warning alarm and switching means all the elements of which are in series between said warning alarm and said source of energy, said switching means comprising a contact arm adapted to be continuously rotated in azimuth, and a plurality of conductive segments symmetrically arranged with respect to said arm, said conductive segments being stationary and having arcuate lengths corresponding to predetermined bearing sectors of said hazard, the contacting of said arm on one of said segments when the bearing of a hazard is in the corresponding sector being a condition precedent to the energizing of said warning alarm, wherein the switching means includes, in series with the first mentioned switch, a second switch having a rotatable contact arm adapted to be positioned in accordance with the true course of said other craft and at least one conductive segment representative in angular length of the course sector in which said other craft is a potential hazard whereby the operation of said warning alarm is made contingent upon the contacting of said arm on said segment and the taking by said hazard of said course, and means for positioning said arm in accordance with the true course of said other craft.

14. In a navigational system of the character described, the combination in accordance with claim 13, wherein the switching means includes the contacts of a relay in series with said first and second switches, and means for closing said contacts when the altitude of said other craft is such that it constitutes a hazard to own craft, whereby the operation of said warning alarm is made contingent upon substantial community of altitude.

15. In a navigational system of the character described, the combination in accordance with claim 14, wherein the switching means includes a fourth switching device in series with the first, second and third switching devices, said fourth switching device comprising the contacts of a relay adapted to be actuated by a sweep type directional receiver, whereby the operation of said warning alarm is made contingent upon the reception of directional signals from said other craft.

16. In a navigational system of the character described, the combination in accordance with claim 15 in which the switching means includes a fifth pair of contacts in series with said first, second, third and fourth switching devices, and means for opening or closing said contacts in accordance with the comparative speeds of own craft and said other craft, whereby the operation of said warning alarm is made contingent upon the speed of such other craft being such as to render it hazardous.

THOMAS A. STANSBURY.

REFERENCES CITED

The following references are of record in the file of this patent:

UNITED STATES PATENTS

| Number | Name | Date |
|---|---|---|
| 1,983,079 | Hansen | Dec. 4, 1934 |
| 1,989,086 | Diamond | Jan. 29, 1935 |
| 2,042,490 | Zahl | June 2, 1935 |
| 2,146,724 | Dunmore | Feb. 14, 1939 |
| 2,157,122 | Dunmore | May 9, 1939 |
| 2,261,272 | Newhouse | Nov. 4, 1941 |
| 2,272,068 | Pollack | Feb. 3, 1942 |
| 2,275,970 | Kazanowski et al. | Mar. 10, 1942 |
| 2,378,604 | Wallace | June 19, 1945 |
| 2,403,603 | Korn | July 9, 1946 |
| 2,411,494 | Bliss | Nov. 19, 1946 |
| 2,414,444 | Busignies | Jan. 21, 1947 |
| 2,425,317 | Harris | Aug. 12, 1947 |
| 2,448,041 | Marchand | Aug. 31, 1948 |
| 2,449,978 | Clark | Sept. 28, 1948 |